United States Patent
Murakami

(10) Patent No.: US 11,792,724 B2
(45) Date of Patent: Oct. 17, 2023

(54) TERMINAL APPARATUS AND COMMUNICATION METHOD

(71) Applicant: Panasonic Intellectual Property Corporation of America, Torrance, CA (US)

(72) Inventor: Yutaka Murakami, Kanagawa (JP)

(73) Assignee: Panasonic Intellectual Property Corporation of America, Torrance, CA (US)

(*) Notice: Subject to any disclaimer, the term of this patent is extended or adjusted under 35 U.S.C. 154(b) by 111 days.

(21) Appl. No.: 17/207,390

(22) Filed: Mar. 19, 2021

(65) Prior Publication Data

US 2021/0211977 A1    Jul. 8, 2021

Related U.S. Application Data

(63) Continuation of application No. 16/854,711, filed on Apr. 21, 2020, now Pat. No. 10,986,569, which is a (Continued)

(30) Foreign Application Priority Data

Jul. 28, 2015    (JP) .................................. 2015-148537

(51) Int. Cl.
  *H04W 48/18*    (2009.01)
  *H04W 88/06*    (2009.01)
  (Continued)

(52) U.S. Cl.
  CPC ........... *H04W 48/18* (2013.01); *H04L 1/0083* (2013.01); *H04L 67/56* (2022.05); *H04W 4/00* (2013.01);
  (Continued)

(58) Field of Classification Search
  CPC ..... H04W 48/18; H04W 76/15; H04W 76/16; H04W 4/00; H04W 4/18; H04W 88/06; H04W 88/14; H04L 67/28; H04L 1/0083
  (Continued)

(56) References Cited

U.S. PATENT DOCUMENTS 4,630,271 A    12/1986  Yamada
6,445,717 B1    9/2002  Gibson et al.
(Continued)

FOREIGN PATENT DOCUMENTS

JP    2005-341310 A    12/2005
JP    2007-129362 A    5/2007
(Continued)

OTHER PUBLICATIONS

International Search Report, dated Aug. 16, 2016, for International Application No. PCT/JP2016/002767, 4 pages.

*Primary Examiner* — Yuwen Pan
*Assistant Examiner* — Angelica Perez
(74) *Attorney, Agent, or Firm* — Seed IP Law Group LLP

(57) ABSTRACT

A terminal apparatus includes a receiver and reception signal control circuitry. The receiver, in operation, receives a first downlink data signal transmitted from a first communication station and receives a second downlink data signal transmitted from a first communication station, the first downlink data signal and the second downlink data signal being received over a first downlink channel and a second downlink channel that are at least partially overlapped in time and frequency domain. The reception signal control circuitry, in operation, demodulates the received first downlink data signal and a second downlink data signal.

8 Claims, 12 Drawing Sheets

Related U.S. Application Data continuation of application No. 15/818,642, filed on Nov. 20, 2017, now Pat. No. 10,667,204, which is a continuation of application No. PCT/JP2016/002767, filed on Jun. 8, 2016.

(51) Int. Cl.
| | | |
|---|---|---|
| *H04W 88/14* | (2009.01) | |
| *H04W 4/00* | (2018.01) | |
| *H04W 76/16* | (2018.01) | |
| *H04W 4/18* | (2009.01) | |
| *H04L 67/56* | (2022.01) | |
| *H04W 76/15* | (2018.01) | |
| *H04L 1/00* | (2006.01) | |

(52) U.S. Cl.
CPC .............. *H04W 4/18* (2013.01); *H04W 76/15* (2018.02); *H04W 76/16* (2018.02); *H04W 88/06* (2013.01); *H04W 88/14* (2013.01)

(58) Field of Classification Search
USPC ....................................................... 455/552.1
See application file for complete search history.

(56) References Cited

U.S. PATENT DOCUMENTS

| 8,718,797 | B1 | 5/2014 | Addepalli et al. |
| 9,479,230 | B2* | 10/2016 | Gao ........................ H04W 72/27 |
| 9,967,056 | B1 | 5/2018 | Hughes |
| 2002/0102987 | A1* | 8/2002 | Souisse ................... H04L 25/14 |
| | | | 455/454 |
| 2012/0246538 | A1* | 9/2012 | Wu .................... H03M 13/3761 |
| | | | 714/752 |
| 2013/0044709 | A1* | 2/2013 | Adjakple ............... H04W 76/15 |
| | | | 370/329 |
| 2013/0290814 | A1 | 10/2013 | Hwang et al. |
| 2017/0163373 | A1 | 6/2017 | Hwang et al. |

FOREIGN PATENT DOCUMENTS

| JP | 2011-061253 A | 3/2011 |
| WO | 2008/013528 | 1/2008 |

\* cited by examiner

FIG. 3

| WIRELESS COMMUNICATION SCHEME | NAME | FREQUENCY |
|---|---|---|
| FIRST WIRELESS COMMUNICATION SCHEME | WIRELESS LAN | 2.4 GHz |
| | | 5 GHz |
| SECOND WIRELESS COMMUNICATION SCHEME | Bluetooth | 2.4 GHz |
| THIRD WIRELESS COMMUNICATION SCHEME | THIRD GENERATION MOBILE PHONE | 800 MHz |
| | | 2 GHz |
| FOURTH WIRELESS COMMUNICATION SCHEME | FOURTH GENERATION MOBILE PHONE | 800 MHz |
| | | 2 GHz |

TERMINAL APPARATUS AND COMMUNICATION METHOD

BACKGROUND

1. Technical Field

The present disclosure relates to a terminal apparatus and communication method for transmitting and receiving data using a plurality of wireless communication schemes.

2. Description of the Related Art

In wireless communication, a method for a communication terminal to efficiently obtain data from a network is important in terms of effective utilization of frequency resources. If the communication terminal supports a plurality of wireless communication schemes, it is desirable to make efficient use of those wireless communication schemes.

For example, Japanese Patent No. 4688638 discloses a mobile communication system that provides communication services to terminals over a plurality of networks, each network corresponding to one of a plurality of wireless communication schemes. In connection with it, the patent discloses a method for switching the network to which a communication terminal connects by registering the position information of the communication terminal to each of the plurality of networks.

SUMMARY

Japanese Patent No. 4688638, however, includes no discussion of a method for switching the network to which the terminal connects without registering the position information of the terminal to each network.

One non-limiting and exemplary embodiment provides a terminal apparatus and communication method that enable a terminal apparatus capable of transmitting and receiving a plurality of modulated signals using a plurality of wireless communication schemes to receive data via a plurality of networks without registering its position information to each of the plurality of networks.

In one general aspect, the techniques disclosed here feature a terminal apparatus including: a transmitter, which in operation, transmits link information related to M individual networks (M being an integer from 2 to N inclusive) via one of the M individual networks and transmits, via the one of the M individual networks, a transmission request for content, each of the M individual networks including corresponding one of M communication stations with which the terminal apparatus has established links among N communication stations (N being an integer greater than or equal to 2) to which the terminal apparatus can connect and which employ different communication schemes from each other; a receiver that receives data related to the content via L individual networks selected based on the link information (L being an integer from 2 to M inclusive) and performs reception processing on the received data for each of L communication schemes; and a received data analyzer that combines data after the reception processing to obtain the content.

It should be noted that general or specific embodiments may be implemented as a system, a method, an integrated circuit, a computer program, a storage medium, or any selective combination thereof.

According to an aspect of the present disclosure, a terminal apparatus capable of transmitting and receiving a plurality of modulated signals using a plurality of wireless communication schemes can receive data via a plurality of networks without registering its position information to each of the plurality of networks.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a table showing an example of wireless communication schemes;

DETAILED DESCRIPTION

Embodiments of the present disclosure will now be described in detail with reference to the drawings. Note that the embodiments described below are merely examples and the present disclosure is not limited by these embodiments.

First Embodiment

Figure 1:
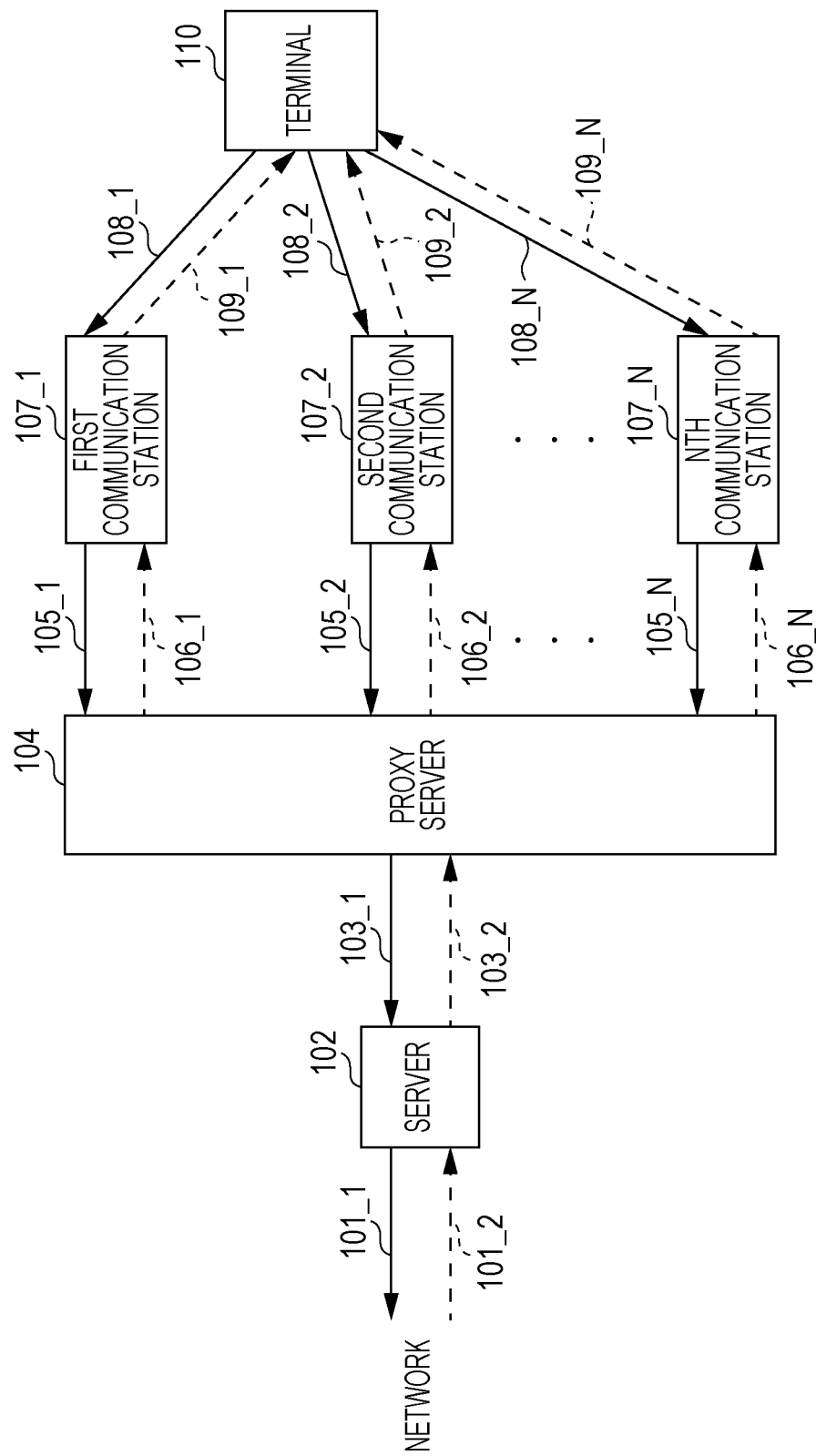
FIG. 1 shows an example of communication condition in the first embodiment.

FIG. 1 shows an example of communication condition in this embodiment. A terminal 110 is a terminal that supports transmission and reception in a plurality of wireless communication schemes. Assume here that the number of wireless communication schemes supported by the terminal 110 is N (where N is an integer greater than or equal to 2, or N is an integer greater than or equal to 3). The N different wireless communication schemes are named "a first wireless communication scheme", "a second wireless communication scheme", "a third wireless communication scheme", . . . , and "an Nth wireless communication scheme". That is, there is an "ith wireless communication scheme" (i is an integer from 1 to N inclusive).

As shown in FIG. 1, the terminal 110 performs communication with a first communication station 107_1 using the first wireless communication scheme. Arrow 108_1 in FIG. 1 means that the terminal 110 transmits a modulated signal and the first communication station 107_1 receives the modulated signal. Arrow 109_1 means that the first communication station 107_1 transmits a modulated signal and the terminal 110 receives the modulated signal.

The terminal 110 also performs communication with a second communication station 107_2 using the second wireless communication scheme. Arrow 108_2 in FIG. 1 means that the terminal 110 transmits a modulated signal and the second communication station 107_2 receives the modulated signal. Arrow 109_2 means that the second communication station 107_2 transmits a modulated signal and the terminal 110 receives the modulated signal.

The terminal 110 also performs communication with an Nth communication station 107_N using the Nth wireless communication scheme. Arrow 108_N in FIG. 1 means that the terminal 110 transmits a modulated signal and the Nth communication station 107_N receives the modulated signal. Arrow 109_N means that the Nth communication station 107_N transmits a modulated signal and the terminal 110 receives the modulated signal.

As mentioned above, it is assumed that the terminal 110 performs communication with the ith communication station 107_$i$ using the ith wireless communication scheme (where i is an integer from 1 to N inclusive).

The first communication station 107_1 performs communication with a proxy server 104. Accordingly, the first communication station 107_1 can send data to the proxy server 104 (105_1) and also receive data from the proxy server 104 (106_1).

Similarly, the second communication station 107_2 performs communication with the proxy server 104. Accordingly, the second communication station 107_2 can send data to the proxy server 104 (105_2) and also receive data from the proxy server 104 (106_2).

Finally, the Nth communication station 107_N performs communication with the proxy server 104. Accordingly, the Nth communication station 107_N can send data to the proxy server 104 (105_N) and also receive data from the proxy server 104 (106_N).

As mentioned above, the ith communication station 107_$i$ performs communication with the proxy server 104; the ith communication station 107_$i$ can send data to the proxy server 104 and receive data from the proxy server 104 (where i is an integer from 1 to N inclusive).

The proxy server 104 performs communication with the ith communication station 107_$i$ (i being an integer from 1 to N inclusive) as already mentioned and also with a server 102. Accordingly, the proxy server 104 can send data to the server 102 (103_1) and also receive data from the server 102 (103_2).

The server 102 performs communication with the proxy server 104 as already mentioned and also can send data to a network (101_1) and receive data from the network (101_2).

Next, using FIG. 1, two methods by which the terminal 110 can obtain data from the network will be described as specific examples of communication.

[First Method for Obtaining Data from Network]

First, a first method by which the terminal 110 can obtain data from the network will be described. A case where the terminal 110 acquires content (or application) #A present on the network will be described. The terminal 110 acquires content (or application) #A from the network by way of the proxy server 104 and the server 102. In the example of FIG. 1, the terminal 110 will acquire the data of content (or application) #A from a plurality of ones of the N communication stations, that is, the first communication station 107_1, the second communication station 107_2, . . . , and the Nth communication station 107_N.

The authority to select these a plurality of communication stations may be possessed either by the terminal 110 or the proxy server 104, as will be described below respectively.

<When Proxy Server 104 Possesses the Authority to Select>

A case where the proxy server 104 possesses the authority to select communication stations will be described. In this case, the proxy server 104 selects a plurality of communication stations for transmitting the data of content (or application) #A. The proxy server 104 then distributes the data of content (or application) #A to the plurality of communication stations selected.

For example, when the proxy server 104 selects the first communication station 107_1 and the second communication station 107_2 for transmitting the data of content (or application) #A, the proxy server 104 will distribute the data of content (or application) #A obtained by way of the server 102 to 106_1 and 106_2.

<When Terminal 110 Possesses the Authority to Select>

A case where the terminal 110 possesses the authority to select communication stations will be described. In this case, the terminal 110 selects a plurality of communication stations for obtaining the data of content (or application) #A. The terminal 110 then transmits information (group information) indicating the plurality of communication stations selected for obtaining the data of content (or application) #A to the proxy server 104 through one of the communication stations. Based on the group information, the proxy server 104 then distributes the data of content (or application) #A to the plurality of selected communication stations.

For example, when the first communication station 107_1 and the second communication station 107_2 are selected, the proxy server 104 will distribute the data of content (or application) #A obtained by way of the server 102 to 106_1 and 106_2.

[Second Method for Obtaining Data from Network]

Next, a second method by which the terminal 110 can obtain data from the network will be described. A case where the terminal 110 acquires a plurality of pieces of content (or applications) present on the network will be described. For example, assume that the terminal 110 is to acquire content (or application) #A and content (or application) #B. In the second method, the terminal 110 will acquire content (or application) #A from one or more communication stations and content (or application) #B from one or more communication stations. The one or more communication stations for obtaining content (or application) #A may partially or entirely overlap the one or more communication stations for obtaining content (or application) #B.

A case where the terminal 110 acquires a plurality of pieces of content (or applications) from a plurality of communication stations as mentioned above will be described. The authority to select the plurality of communication stations and/or the authority to designate communication stations from which the terminal is to obtain each piece of content among the selected a plurality of communication stations may be possessed either by the terminal 110 or the proxy server 104, as described below.

<When Proxy Server 104 Possesses the Authority to Select>

A case where the proxy server 104 possesses the authority to select the communication station(s) which will send the data of content (or application) #A and/or the authority to select the communication station(s) which will send the data of content (or application) #B will be described. In this case, the proxy server 104 selects one or more communication stations as transmitting stations that are to send the data of content (or application) #A. The proxy server 104 also selects one or more communication stations as transmitting stations that are to send the data of content (or application) #B. The proxy server 104 then distributes the data of content (or application) #A to the one or more communication stations selected for content (or application) #A and/or distributes the data of content (or application) #B to the one or more communication stations selected for content (or application) #B.

For example, assume that the proxy server 104 selects the first communication station 107_1 and the second communication station 107_2 for transmitting the data of content (or application) #A and selects the Nth communication station 107_N for transmitting the data of content (or application) #B. In this case, the proxy server 104 will distribute the data of content (or application) #A obtained by way of the server 102 to 106_1 and 106_2, and distributes the data of content (or application) #B obtained by way of the server 102 to 106_N.

<When Terminal 110 Possesses the Authority to Select>

A case where the terminal 110 possesses the authority to select the communication station(s) which will send the data of content (or application) #A and/or the authority to select the communication station(s) which will send the data of content (or application) #B will be described. In this case, the terminal 110 selects one or more communication stations for obtaining the data of content (or application) #A. The terminal 110 also selects one or more communication stations for obtaining the data of content (or application) #B. The terminal 110 then transmits information (group information A) indicating the communication station(s) selected for obtaining the data of content (or application) #A, and/or information (group information B) indicating the communication station(s) selected for obtaining the data of content (or application) #B to the proxy server 104 through one of the communication stations. The proxy server 104 then distributes the data of content (or application) #A to communication station(s) based on the group information A. The proxy server 104 also distributes the data of content (or application) #B to communication station(s) based on the group information B.

For example, when the first communication station 107_1 and the second communication station 107_2 are selected for obtaining the data of content (or application) #A, the proxy server 104 distributes the data of content (or application) #A obtained by way of the server 102 to 106_1 and 106_2. When the Nth communication station 107_N is selected for obtaining the data of content #B, the proxy server 104 distributes the data of content (or application) #B obtained by way of the server 102 to 107_N.

Figure 2:
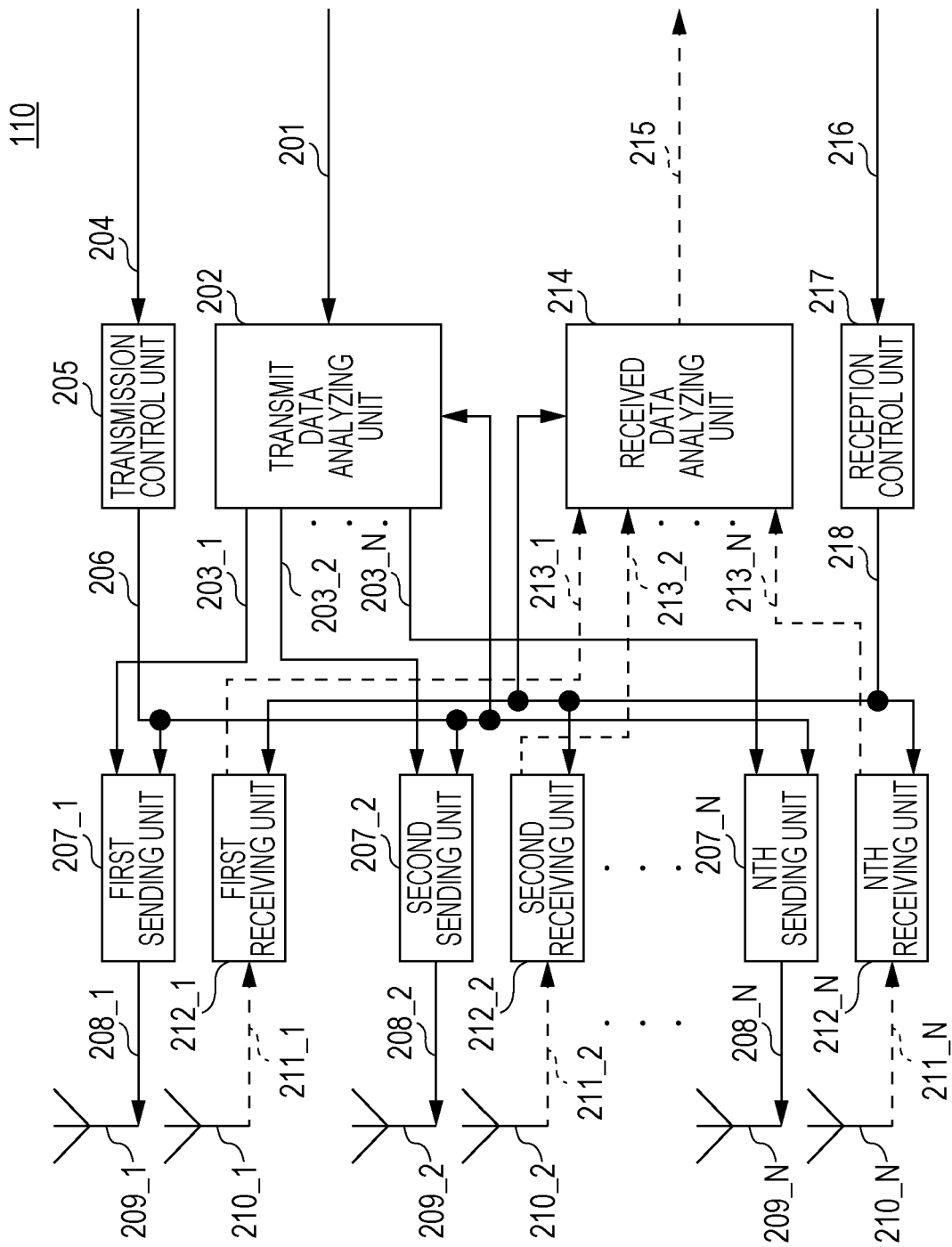
FIG. 2 shows an exemplary configuration of a terminal.

FIG. 2 shows an exemplary configuration of the terminal 110 according to this embodiment.

A transmission control unit 205 takes transmission control information 204 as input, and outputs a transmission control signal 206 which is based on the transmission control information 204. The transmission control information 204 includes information for processing associated with transmission by each wireless communication scheme, such as error correction coding used for data sent by the terminal from each transmitting unit, a modulation scheme (mapping) for generating modulated signals, frequency conversion, and amplification, for example. Detailed operations will be described later.

A reception control unit 217 takes a reception control information 216 as input and outputs a reception control signal 218 which is based on the reception control information 216. The reception control information 216 includes information for processing associated with reception by each wireless communication scheme, such as frequency conversion, demodulation, and error correction decoding to be applied to signals received by each receiving unit, for example.

A transmit data analyzing unit 202 takes transmission information 201 and the transmission control signal 206 as input, controls the transmission information 201 based on the transmission control signal 206, and outputs first transmit data 203_1, second transmit data 203_2, . . . , and the Nth transmit data 203_N. That is, the transmit data analyzing unit 202 outputs an ith transmit data 203_*i* (i being an integer from 1 to N inclusive (N being an integer greater than or equal to 2, or greater than or equal to 3)).

A first transmitting unit 207_1 takes the first transmit data 203_1 and the transmission control signal 206 as input, applies processing such as error correction coding, modulation (mapping), frequency conversion, and amplification (applies processing for transmission by the first wireless communication scheme) to the first transmit data 203_1 based on the transmission control signal 206, and outputs a first transmit signal 208_1. The first transmit signal 208_1 is output from a first transmit antenna 209_1 as a radio wave.

A second transmitting unit 207_2 takes the second transmit data 203_2 and the transmission control signal 206 as input, applies processing such as error correction coding, modulation (mapping), frequency conversion, and amplification (applies processing for transmission by the second wireless communication scheme) to the second transmit data 203_2 based on the transmission control signal 206, and outputs a second transmit signal 208_2. The second transmit signal 208_2 is output from a second transmit antenna 209_2 as a radio wave.

An Nth transmitting unit 207_N takes the Nth transmit data 203_N and the transmission control signal 206 as input, applies processing such as error correction coding, modulation (mapping), frequency conversion, amplification (applies processing for transmission by the Nth wireless communication scheme) to the Nth transmit data 203_N based on the transmission control signal 206, and outputs an Nth transmit signal 208_N. The Nth transmit signal 208_N is output from an Nth transmit antenna 209_N as a radio wave.

Similarly, an ith transmitting unit 207_*i* takes an ith transmit data 203_*i* and the transmission control signal 206 as input, applies processing such as error correction coding, modulation (mapping), frequency conversion, and amplification (applies processing for transmission by the ith wireless communication scheme) to the ith transmit data 203_*i* based on the transmission control signal 206, and outputs an ith transmit signal 208_*i*. The ith transmit signal 208_*i* is output from the ith transmit antenna 209_*i* as a radio wave (i being an integer from 1 to N inclusive).

A first receiving unit 212_1 takes a first received signal 211_1 received by a first receive antenna 210_1 and a reception control signal 218 as input, performs reception processing (such as frequency conversion, demodulation, and error correction decoding) on the first received signal 211_1 (applies processing for reception by the first wireless communication scheme) based on the reception control signal 218, and outputs a first received data 213_1.

A second receiving unit 212_2 takes a second received signal 211_2 received by a second receive antenna 210_2 and the reception control signal 218 as input, performs reception processing (such as frequency conversion, demodulation, and error correction decoding) on the second received signal 211_2 (applies processing for reception by the second wireless communication scheme) based on the reception control signal 218, and outputs a second received data 213_2.

An Nth receiving unit 212_N takes an Nth received signal 211_N received by an Nth receive antenna 210_N and the reception control signal 218 as input, performs reception processing (such as frequency conversion, demodulation, and error correction decoding) on the Nth received signal 211_N (applies processing for reception by the Nth wireless communication scheme) based on the reception control signal 218, and outputs an Nth received data 213_N.

Similarly, an ith receiving unit 212_i takes an ith received signal 211_i received by an ith receive antenna 210_i and the reception control signal 218 as input, performs reception processing (such as frequency conversion, demodulation, and error correction decoding) on the ith received signal 211_i (applies processing for reception by the ith wireless communication scheme) based on the reception control signal 218, and outputs an ith received data 213_i (i being an integer from 1 to N inclusive).

A received data analyzing unit 214 takes the first received data 213_1, the second received data 213_2, . . . , and the Nth received data 213_N (that is, the ith received data 213_i (i being an integer from 1 to N inclusive (N being an integer greater than or equal to 2, or greater than or equal to 3))) and the reception control signal 218 as input, and outputs received data 215 based on the reception control signal 218.

With the configuration of FIG. 2, the communication described with FIG. 1, in particular simultaneous reception of a plurality of modulated signals and simultaneous transmission of a plurality of modulated signals are carried out.

Although an antenna is connected to each of the transmitting units and receiving units in FIG. 2, the present disclosure is not limited to this. For example, a single antenna may be used for both transmission and reception per communication scheme. Alternatively, an antenna may be shared among a plurality of transmitting units and a plurality of receiving units. Alternatively, a plurality of antennas may be connected to each transmitting unit and each receiving unit.

In the context of the present disclosure, a plurality of signals may be sent via each transmitting unit or a plurality of signals may be received by each receiving unit. For example, a terminal may be configured to send a plurality of modulated signals which are different in frequency, frequency band, the number of transmit antennas, and the like from each other in the corresponding wireless communication scheme through each transmitting unit (that is, each transmitting unit may be configured to send the same a plurality of modulated signals). In this case, a plurality of transmit signals may be input to each transmitting unit. The terminal may also be configured to receive a plurality of modulated signals which are different in frequency, frequency band, the number of transmit antennas, and the like from each other in the corresponding wireless communication scheme through each receiving unit. In this case, a plurality of signals may be output by each receiving unit.

Next, an example of a plurality of wireless communication schemes used by the terminal 110 for transmission and reception will be described.

FIG. 3 is a table showing an example of wireless communication schemes. In the example of FIG. 3, the number of wireless communication schemes is N=4 in connection with FIGS. 1 and 2. It is assumed that the wireless communication schemes shown in FIG. 3 respectively correspond to the first to fourth wireless communication scheme.

In the example of FIG. 3, the first wireless communication scheme indicates that the communication scheme is wireless local area network (LAN) and the frequency used is 2.4 GHz or 5 GHz. Similarly, the second wireless communication scheme indicates that the communication scheme is Bluetooth® and the frequency used is 2.4 GHz. The third wireless communication scheme indicates that the communication scheme is the third generation mobile phone and the frequency used is 800 MHz or 2 GHz. The fourth wireless communication scheme indicates that the communication scheme is the fourth generation mobile phone and the frequency used is 800 MHz or 2 GHz.

While FIG. 3 shows a case where the first to fourth wireless communication schemes are different from each other, two or more same wireless communication schemes may be included. For instance, the first and the second wireless communication schemes may be wireless local area network (LAN) and use the same or different frequencies. In such a case, the provider that provides communication services in the first wireless communication scheme (for example, wireless LAN) may be the same or different from the provider that provides communication services in the second wireless communication scheme (for example, wireless LAN).

Next, the configuration of the proxy server 104 in FIG. 1 will be described.

Figure 4:
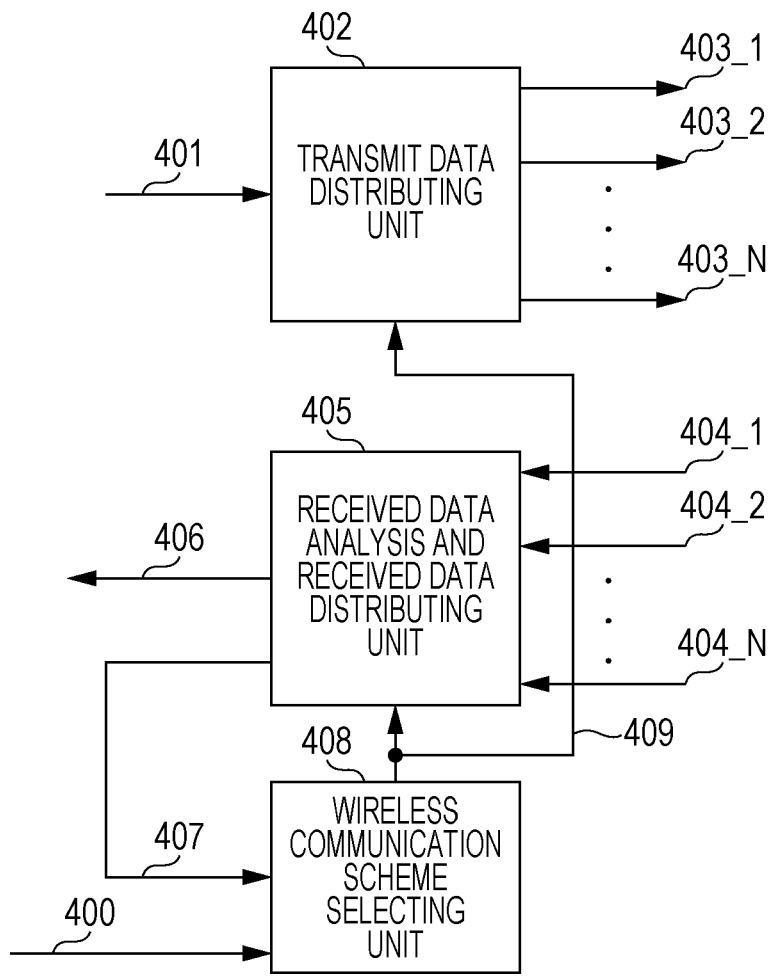
FIG. 4 shows an exemplary configuration of a proxy server.

FIG. 4 shows an exemplary configuration of the proxy server 104. The proxy server 104 shown in FIG. 4 includes a transmit data distributing unit 402, a received data analysis and received data distributing unit 405, and a wireless communication scheme selecting unit 408.

The transmit data distributing unit 402 takes transmit data 401 (the transmit data 103_2 in FIG. 1) and a control signal 409 as input, and outputs transmit data 403_1 for the first communication station (the transmit data 106_1 for the first communication station in FIG. 1), transmit data 403_2 for the second communication station (the transmit data 106_2 for the second communication station in FIG. 1), . . . , and transmit data 403_N for the Nth communication station (the transmit data 106_N for the Nth communication station in FIG. 1) based on the control signal 409.

The transmit data distributing unit 402 does not always output all of the transmit data 403_1 for the first communication station, transmit data 403_2 for the second communication station, . . . , and transmit data 403_N for the Nth communication station. The transmit data distributing unit 402 outputs transmit data to communication stations which send a modulated signal. Information on how to control distribution by the transmit data distributing unit 402 is included in the control signal 409.

The received data analysis and received data distributing unit 405 takes received data 404_1 from the first communication station (the received data 105_1 from the first communication station in FIG. 1), received data 404_2 from the second communication station (the received data 105_2 from the second communication station in FIG. 1), . . . , and received data 404_N from the Nth communication station (the received data 105_N from the Nth communication station in FIG. 1), and the control signal 409 as input, performs analysis and distribution of the received data based on the control signal 409, and outputs received data 406 (the received data 103_1 in FIG. 1).

To the received data analysis and received data distributing unit 405, the received data 404_1 from the first communication station, received data 404_2 from the second communication station, . . . , and received data 404_N from the Nth communication station are input. However, data is not always present in all of the received data 404_1 through 404_N. To the received data analysis and received data distributing unit 405, only received data obtained by communication stations that received a modulated signal transmitted by the terminal 110 are input. Information on how to control analysis and distribution of received data by the received data analysis and received data distributing unit 405 is included in the control signal 409.

The received data analysis and received data distributing unit 405 also retrieves a terminal request from control information contained in each of the received data 404_1 from the first communication station, the received data 404_2 from the second communication station, . . . , and the received data 404_N from the Nth communication station, and outputs a terminal request signal 407. The terminal request contains information on communication stations that the terminal can access and/or information on communication stations with which the terminal has already established links, for example.

The wireless communication scheme selecting unit 408 takes a (network-side) request signal 400 and the terminal request signal 407 as input, determines communication stations which will send a modulated signal and communication stations which will receive a modulated signal, and outputs the control signal 409 including information on the communication stations determined.

Figure 5:
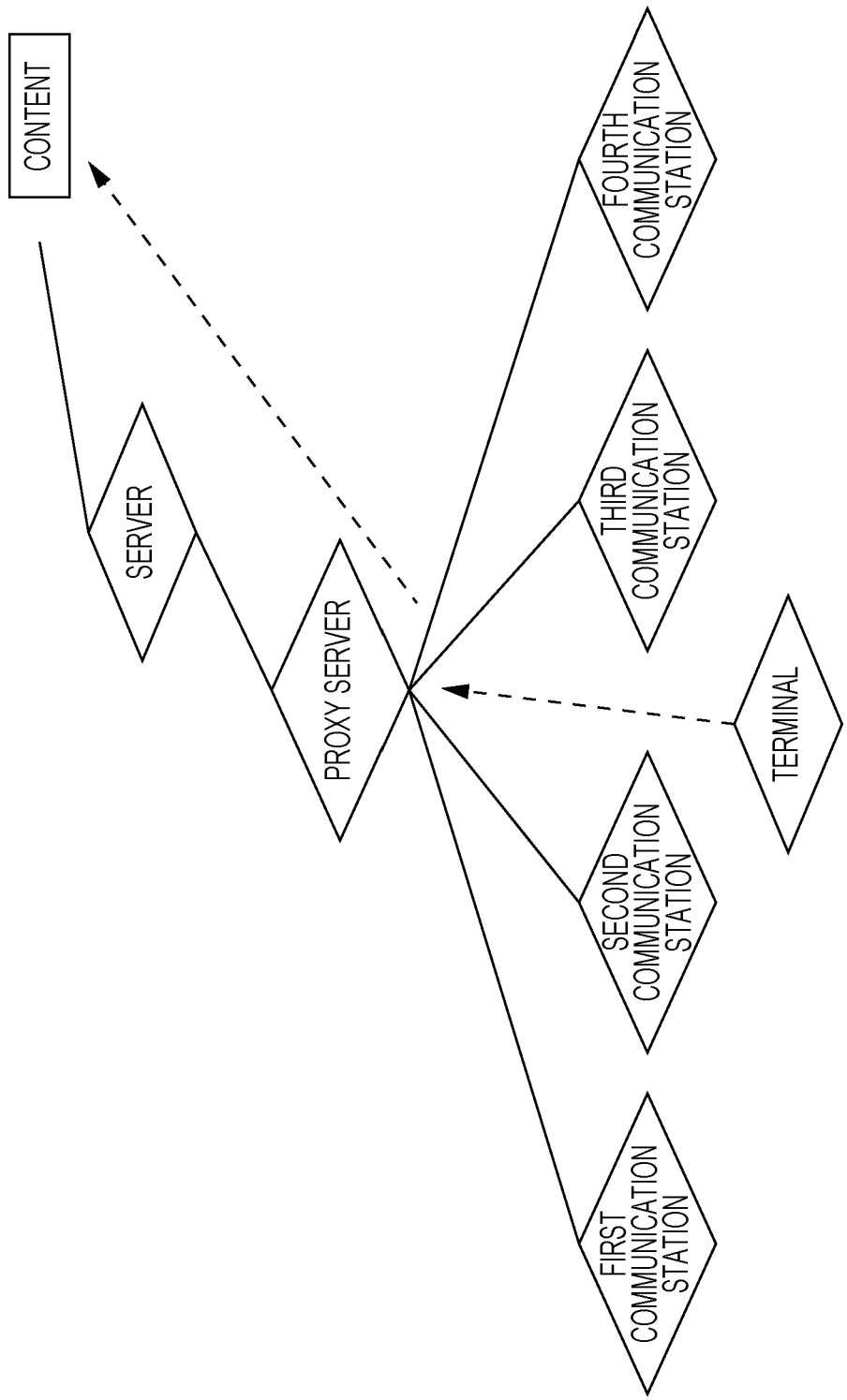
FIG. 5 shows an example of communication condition in the first embodiment.

Next, a process for the terminal to acquire content on the network via communication station(s), the proxy server, and the server in this embodiment will be described. FIG. 5 shows an example of communication condition. In the example shown in FIG. 5, the terminal establishes links with the first to fourth communication stations and requests content data via at least one or more of those communication stations.

Figure 6:
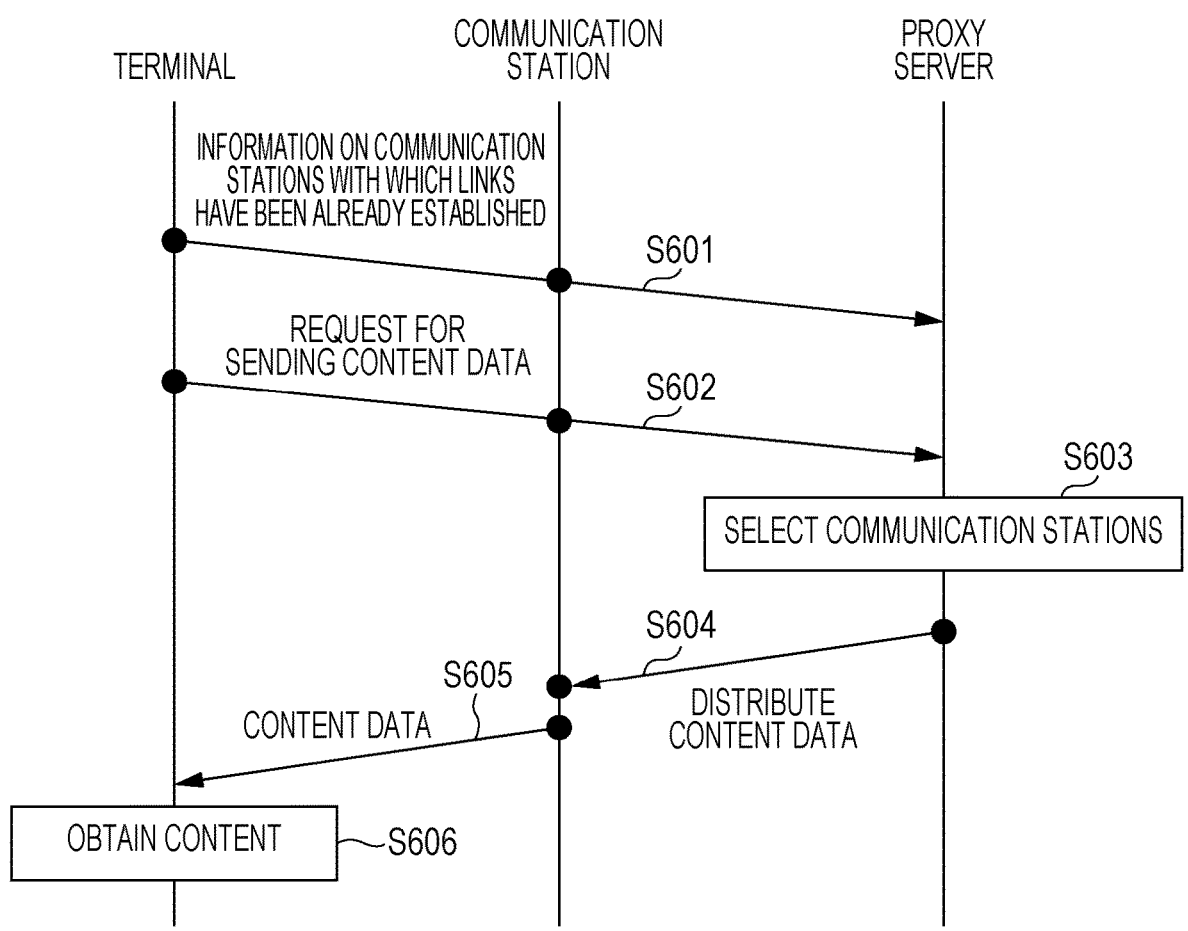
FIG. 6 is a sequence diagram illustrating a procedure of a content acquisition method in the first embodiment.

FIG. 6 is a sequence diagram illustrating a procedure of the content acquisition method in this embodiment. For the sake of simplicity, FIG. 6 shows only one communication station. In the following, the procedure of the content acquisition method will be described with reference to FIG. 6.

The terminal transmits "information on communication stations with which links have been already established" to the proxy server via the communication station (S601). The proxy server saves the information on communication stations with which links have been already established with the terminal.

The terminal then makes a request for content data via one of the communication stations by way of the proxy server (S602).

The proxy server then selects communication stations to be used for transmitting the data of the requested content based on the information on communication stations with which links have been already established (S603).

The proxy server does not have to transmit content data to the terminal using all of the communication stations with which links have been already established. That is, the proxy server may transmit content data via at least some of the communication stations with which links have been already established. In such a case, selection of communication station(s) to be used for transmitting content data will be made based on instructions from the network, the server, and communication stations, and/or feedback information from the terminal.

Next, the proxy server distributes content data to the communication station(s) selected and transmits the content data (S604). The communication station(s) send the distributed content data to the terminal in accordance with the instruction from the proxy server (S605).

The terminal receives content data transmitted from at least one or more communication stations and performs reception processing and other kinds of processing on the received data to obtain the content (S606).

Although the example of FIG. 6 shows that content data is transmitted from a single communication station, content data may be transmitted from a plurality of communication stations. In addition, the example of FIG. 6 illustrates a case where the communication station via which the terminal transmits the information on communication stations with which links have been already established to the proxy server, the communication station via which the request for content data is made, and the communication station that transmits content data to the terminal are the same one communication station. According to the present disclosure, however, the communication station via which the terminal transmits the information on communication stations with which links have been already established to the proxy server, the communication station via which the request for content data is made, and the communication station that transmits content data to the terminal may be different from each other.

The details of the communication condition in FIG. 5 are as shown in FIG. 1. The terminal described in FIG. 6 has the configuration shown in FIG. 2. The proxy server described in FIG. 6 has the configuration shown in FIG. 4. The operation at S603 described in FIG. 6 is conducted by the wireless communication scheme selecting unit 408 of FIG. 4. The operation at S604 is conducted by the transmit data distributing unit 402 of FIG. 4.

The received data analysis and received data distributing unit 405 takes the received data 404_1 from the first communication station, the received data 404_2 from the second communication station, . . . , and the received data 404_N from the Nth communication station, and the control signal 409 as input. The received data analysis and received data distributing unit 405 then performs analysis and distribution of the received data based on the control signal 409, and outputs the received data 406. With this configuration, the received data analysis and received data distributing unit 405 conducts the receiving operations at S601 and S602 in FIG. 6.

To the received data analysis and received data distributing unit 405, the received data 404_1 from the first communication station, the received data 404_2 from the second communication station, . . . , and the received data 404_N from the Nth communication station are input. However, data is not always present in all of the received data 404_1 through 404_N. To the received data analysis and received data distributing unit 405, only received data obtained by communication stations that received a modulated signal transmitted by the terminal 110 are input. Information on how to control analysis and distribution of received data by the received data analysis and received data distributing unit 405 is included in the control signal 409.

Figure 7B:
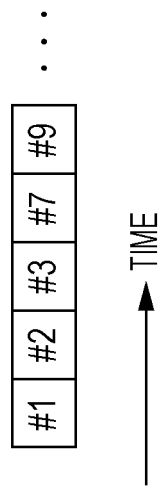
FIGS. 7A to 7C show an example of a content transmitting method.
Figure 7C:
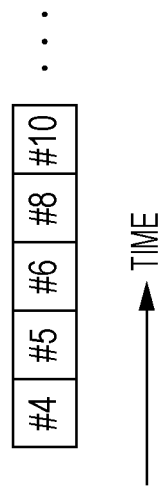
Figure 7A:

Next, the content transmitting method described with FIGS. 5 and 6 will be described using FIGS. 7A to 7C. FIGS. 7A to 7C show an example of the content transmitting method in this embodiment.

For example, assume that the proxy server selects the first and the fourth communication stations for transmitting content data based on the information on communication stations with which links have been already established. This selection is made by the wireless communication scheme selecting unit 408 of FIG. 4. Using FIGS. 7A to 7C, how the transmit data distributing unit 402 of FIG. 4 distributes transmit data in this case will be described.

FIG. 7A illustrates the transmit data 401 in FIG. 4, FIG. 7B illustrates the transmit data 403_1 for the first communication station in FIG. 4, and FIG. 7C illustrates the transmit data for the fourth communication station in FIG. 4. The horizontal axis in FIGS. 7A to 7C represents time.

As shown in FIG. 7A, data are input to the transmit data distributing unit 402 of FIG. 4 as data #1, data #2, data #3, . . . , with respect to the time on the horizontal axis. The unit of data may be any of bit, byte, packet, or frame.

The transmit data distributing unit 402 of FIG. 4 then determines to send data #1 through the first communication station; thus the data is placed as shown in FIG. 7B.

The transmit data distributing unit 402 of FIG. 4 also determines to send data #2, data #3, data #7, data #9, . . . through the first communication station; thus the data are placed as shown in FIG. 7B.

The transmit data distributing unit 402 of FIG. 4 further determines to send data #4 through the fourth communication station; thus the data is placed as shown in FIG. 7C.

The transmit data distributing unit 402 of FIG. 4 also determines to send data #5, data #6, data #8, data #10, . . . , through the fourth communication station; thus the data are placed as shown in FIG. 7C.

The transmit data distributing unit 402 of FIG. 4 distributes the data shown in FIG. 7B to the first communication station and the data shown in FIG. 7C to the fourth communication station. The first and fourth communication stations each send the distributed data to the terminal.

Data related to the content requested by the terminal may include an information packet comprising information bits for the body data of the content and a parity packet comprising parity bits added for error correction of the body data of the content. In this case, the data related to the content will be coded with an error correction code. The error correction code introduced in this layer is referred to as application layer forward error correction (FEC). At the communication stations described hereinafter, coding with the error correction code is performed again for wireless transmission, for example. That is, error correction coding at the physical layer (PHY layer) is performed. When an information packet and a parity packet are transmitted, the communication station that transmits the information packet may be different from the communication station that transmits the parity packet. By the terminal receiving the information packet and the parity packet via different communication stations, reception processing at the terminal is kept from becoming complicated.

When the application layer FEC is not introduced, packets would be generated from the content body, for example.

As described above, a terminal capable of transmitting and receiving a plurality of modulated signals using a plurality of wireless communication schemes shares information on communication stations with which links have been already established with a proxy server present on the network. This makes a plurality of communication stations send a plurality of modulated signals, so that data can be efficiently transmitted from the network. Also, the communication terminal can efficiently improve the data transmission rate by receiving a plurality of modulated signals to obtain data, providing the effect of improved efficiency of frequency utilization.

This embodiment has been described by taking wireless LAN, Bluetooth®, the third generation mobile phone, and the fourth generation mobile phone as examples of communication schemes as described in FIG. 3, but communication schemes are not limited to these. This embodiment can be similarly practiced when other wireless communication scheme is selected as one of the communication schemes used for simultaneous transmission.

Although it is described as proxy server in this embodiment, the proxy server may instead be the server. Likewise, the server may instead be the proxy server. Accordingly, a configuration including no proxy server or no server is also possible.

Second Embodiment

A second embodiment will describe a method in which a terminal shares with a proxy server information on communication schemes the terminal can use for communication and data is transmitted by communication stations belonging to a plurality of individual networks.

Figure 8:
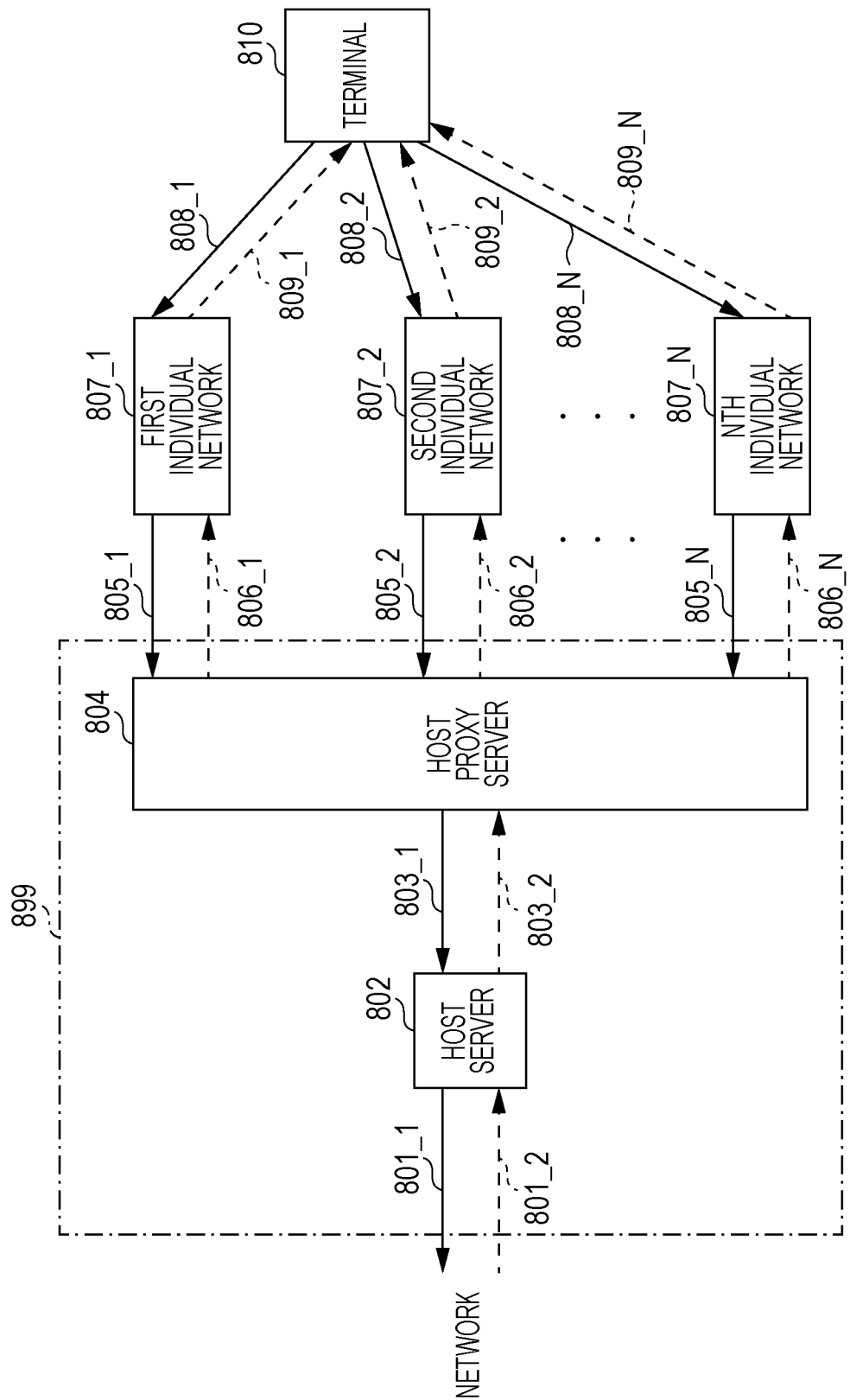
FIG. 8 shows an example of communication condition in a second embodiment.

FIG. 8 shows an example of communication condition in this embodiment. A terminal 810 is a terminal that supports transmission and reception in a plurality of wireless communication schemes. Assume here the terminal 810 supports N types of wireless communication scheme (N being an integer greater than or equal to 2 (or N being an integer greater than or equal to 3)), and the N types of wireless communication schemes are named "a first wireless communication scheme", "a second wireless communication scheme", "a third wireless communication scheme", . . . , and "an Nth wireless communication scheme". That is, there is an "ith wireless communication scheme" (i being an integer from 1 to N inclusive).

However, the terminal 810 does not have to support transmission and reception by all of the N types of wireless communication scheme. In other words, the terminal 810 supports transmission and reception by N or less types of (two or more types of) wireless communication scheme.

As shown in FIG. 8, the terminal 810 can perform communication with a first individual network 807_1 including a first communication station by the first wireless communication scheme. Arrow 808_1 in FIG. 8 means that terminal 810 transmits a modulated signal and the first individual network 807_1 receives the modulated signal.

Arrow 809_1 means that the first individual network 807_1 transmits a modulated signal and the terminal 810 receives the modulated signal.

The phrase "a first individual network including a first communication station" means at least including a communication station and a server, or at least including a communication station and a proxy server.

The terminal 810 can perform communication with a second individual network 807_2 including a second communication station by the second wireless communication scheme. Arrow 808_2 in FIG. 8 means that the terminal 810 transmits a modulated signal and the second individual network 807_2 receives the modulated signal. Arrow 809_2 means that the second individual network 807_2 transmits a modulated signal and the terminal 810 receives the modulated signal.

The phrase "a second individual network including a second communication station" means at least including a communication station and a server, or at least including a communication station and a proxy server.

The terminal 810 can perform communication with an Nth individual network 807_N including the Nth communication station by the Nth wireless communication scheme. Arrow 808_N in FIG. 8 means that the terminal 810 transmits a modulated signal and the Nth individual network 807_N receives the modulated signal. Arrow 809_N means that the Nth individual network 807_N transmits a modulated signal and the terminal 810 receives the modulated signal.

The phrase "the Nth individual network including the Nth communication station" means that each individual network at least includes a communication station and a server, or at least includes a communication station and a proxy server.

As mentioned above, the terminal 810 can perform communication with the ith, or any, individual network including the ith communication station by the ith wireless communication scheme (where i is an integer from 1 to N inclusive).

A feature of this embodiment is that, separately from the first individual network 807_1, the second individual network 807_2, . . . , and the Nth individual network 807_N, it includes a host network 899 located upstream of the N individual networks. The host network 899 includes a host server 802 and a host proxy server 804.

The first individual network 807_1 performs communication with the host proxy server 804. Accordingly, the first individual network 807_1 can send data to the host proxy server 804 (805_1) and also receive data from the host proxy server 804 (806_1).

Similarly, the second individual network 807_2 performs communication with the host proxy server 804. Accordingly, the second individual network 807_2 can send data to the host proxy server 804 (805_2) and also receive data from the host proxy server 804 (806_2).

Finally, the Nth individual network 807_N performs communication with the host proxy server 804. Accordingly, the Nth individual network 807_N can send data to the host proxy server 804 (805_N) and also receive data from the host proxy server 804 (806_N).

As mentioned above, the ith individual network 807_i performs communication with the host proxy server 804, and can send or receive data (where i is an integer from 1 to N inclusive).

The host proxy server 804 performs communication with the ith individual network 807_i (i being an integer from 1 to N inclusive) and also with the host server 802. Thus, the host proxy server 804 can send data to the host server 802 (803_1) and also receive data from the host server 802 (803_2).

The host server 802 performs communication with the host proxy server 804, and also can send data to a network further upstream from the host network 899 (801_1) and receive data from the network (801_2).

Next, using FIG. 8, two methods by which the terminal 810 can obtain data from the network will be described as specific examples of communication.

[First Method for Obtaining Data from Network]

First, a first method by which the terminal 810 can obtain data from the network will be described. A case where the terminal 810 acquires content (or an application) #A present on the network will be described. The terminal 810 acquires content (or application) #A from the network by way of the host proxy server 804 and the host server 802. In the example of FIG. 8, the terminal 810 will acquire the data of content (or application) #A via M (M being an integer from 2 to N inclusive) communication stations out of the N communication stations included in the first individual network 807_1, the second individual network 807_2, . . . , and the Nth individual network 807_N.

The authority to select these a plurality of communication stations may be possessed either by the terminal 810 or the host proxy server 804, as will be described below respectively.

<When the Host Proxy Server 804 Possesses the Authority to Select>

A case where the host proxy server 804 possesses the authority to select communication stations will be described.

In this case, the host proxy server 804 selects M communication stations for transmitting the data of content (or application) #A. The host proxy server 804 then distributes the data of content (or application) #A to the M individual networks respectively including the M selected communication stations.

For example, a case where the host proxy server 804 transmits data of content (or application) #A to the terminal 810 through the first individual network 807_1 including the first communication station and the second individual network 807_2 including the second communication station will be described. In this case, the host proxy server 804 will distribute the data of content (or application) #A obtained by way of the host server 802 to 806_1 and 806_2 in FIG. 8.

<When Terminal 810 Possesses the Authority to Select>

A case where the terminal 810 possesses the authority to select communication stations will be described. In this case, the terminal 810 selects M communication stations for obtaining the data of content (or application) #A. The terminal 810 then transmits information on the M individual networks respectively including the M communication stations selected for obtaining the data of content (or application) #A to the host proxy server 804 through an individual network including one of the communication stations. The host proxy server 804 then distributes the data of content (or application) #A to the M individual networks based on the information.

For example, a case where the host proxy server 804 transmits the data of content (or application) #A to the terminal 810 through the first individual network 807_1 including the first communication station and the second individual network 807_2 including the second communication station will be described. In this case, the host proxy server 804 will distribute the data of content (or application) #A obtained by way of the host server 802 to 806_1 and 806_2 in FIG. 8.

[Second Method for Obtaining Data from Network]

Next, a second method by which the terminal 810 can obtain data from the network will be described. A case where the terminal 810 acquires a plurality of pieces of content (or applications) present on a network will be described. For example, assume that the terminal 810 is to acquire content (or application) #A and content (or application) #B. In the second method, the terminal 810 will acquire content (or application) #A from one or more individual networks corresponding to one or more communication stations and content (or application) #B from one or more individual networks corresponding to one or more communication stations. The one or more communication stations for obtaining content #A may partially or entirely overlap the one or more communication stations for obtaining content #B.

A case where the terminal 810 acquires a plurality of pieces of content from a plurality of communication stations will be described. The authority to select the plurality of individual networks respectively corresponding to those communication stations and/or the authority to designate individual networks including communication stations from which the terminal is to obtain each piece of content may be possessed either by the terminal 810 or the host proxy server 804 as described below.

<When Host Proxy Server 804 Possesses the Authority to Select>

A case where the host proxy server 804 possesses the authority to select individual networks including communication stations which will send the data of content (or application) #A and/or the authority to select individual networks including communication stations which will send the data of content (or application) #B will be described. In this case, the host proxy server 804 selects one or more individual networks corresponding to one or more communication stations as individual network(s) including the communication station(s) which will send the data of content (or application) #A. The host proxy server 804 also selects one or more individual networks corresponding to one or more communication stations as individual network(s) including the communication station(s) which will send the data of content (or application) #B. The host proxy server 804 then distributes the data of content (or application) #A to the one or more individual networks selected for content (or application) #A, and/or distributes the data of content (or application) #B to the one or more individual networks selected for content (or application) #B.

For example, assume that the host proxy server 804 selects the first individual network 807_1 including the first communication station and the second individual network 807_2 including the second communication station for transmitting the data of content (or application) #A, and selects the Nth individual network 807_N including the Nth communication station for transmitting the data of content (or application) #B. In this case, the host proxy server 804 will distribute the data of content (or application) #A obtained by way of the host server 802 to 806_1 and 806_2 in FIG. 8, and distribute the data of content (or application) #B obtained by way of the host server 802 to 806_N.

<When Terminal 810 Possesses the Authority to Select>

A case where the terminal 810 possesses the authority to select individual network(s) including communication station(s) which will send the data of content (or application) #A and/or the authority to select individual network(s) including communication station(s) which will send the data of content (or application) #B will be described. In this case, the terminal 810 selects one or more individual networks for obtaining data of content (or application) #A and/or selects one or more individual networks for obtaining data of content (or application) #B. The terminal 810 then transmits information on individual network(s) including the communication station(s) selected for obtaining the data of content (or application) #A and/or information on individual network(s) including the communication station(s) selected for obtaining the data of content (or application) #B to the host proxy server 804 through an individual network including one of the communication stations. The host proxy server 804 then distributes data to individual network(s) including the communication station(s) which will send the data of content (or application) #A based on the information received from the terminal. The host proxy server 804 also distributes data to individual network(s) including the communication station(s) which will send the data of content (or application) #B.

For example, when the data of content (or application) #A is to be transmitted to the terminal 810 through the first individual network 807_1 including the first communication station and the second individual network 807_2 including the second communication station, the host proxy server 804 will distribute the data of content (or application) #A obtained by way of the host server 802 to 806_1 and 806_2 in FIG. 8. Likewise, when the data of content (or application) #B is to be transmitted to the terminal 810 through the Nth individual network 807_N including the Nth communication station, the host proxy server 804 will distribute the data of content (or application) #B obtained by way of the host server 802 to 806_N in FIG. 8.

Figure 9:
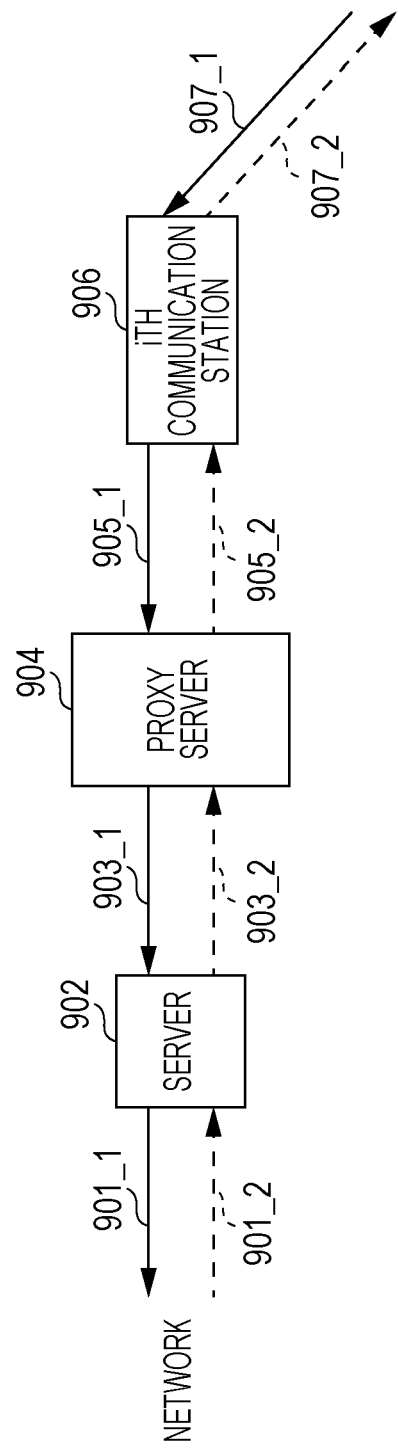
FIG. 9 shows an exemplary configuration of the ith individual network including the ith communication station.

Next, the N individual networks described in FIG. 8 will be described by taking the ith individual network 807_i (i being an integer from 1 to N inclusive) as an example. FIG. 9 shows an exemplary configuration of the ith individual network 807_i including the ith communication station. As shown in FIG. 9, the ith individual network includes an ith communication station 906, a server 902, and a proxy server 904.

The server 902 performs communication with the network. Arrow 901_1 in FIG. 9 indicates a signal transmitted by the server 902 to the network, and arrow 901_2 indicates a signal received by the server 902 from the network.

The proxy server 904 performs communication with the server 902. Arrow 903_1 in FIG. 9 indicates a signal transmitted by the proxy server 904 to the server 902, and arrow 903_2 indicates a signal received by the proxy server 904 from the server 902.

The proxy server 904 performs communication with the ith communication station 906. Arrow 905_1 in FIG. 9 indicates a signal received by the proxy server 904 from the ith communication station 906, that is, a signal transmitted by the ith communication station 906 to the proxy server 904. Arrow 905_2 in FIG. 9 indicates a signal transmitted by the proxy server 904 to the ith communication station 906, that is, a signal received by the ith communication station 906 from the proxy server 904.

The ith communication station 906 performs communication with the proxy server 904. The ith communication station 906 also performs communication with a terminal. Arrow 907_1 in FIG. 9 indicates a signal received by the ith communication station 906 from the terminal, and arrow 907_2 indicates a signal transmitted by the ith communication station 906 to the terminal.

As the terminal 810 in this embodiment has a similar configuration to the one shown in FIG. 2 and performs similar operations to the terminal described in the first embodiment, they are not described again.

An example of the plurality of wireless communication schemes used by the terminal 810 in this embodiment for transmission and reception is similar to the example described in FIG. 3. It is assumed that N=4, that is, the terminal 810 supports the first through fourth wireless communication schemes.

An example of the configuration of the host proxy server 804 in this embodiment is similar to that of the proxy server 104 shown in FIG. 4. In the following, the configuration of the host proxy server 804 will be described using FIG. 4.

The transmit data distributing unit 402 takes the transmit data 401 (the transmit data 803_2 in FIG. 8) and the control signal 409 as input, and outputs the transmit data 403_1 for the first individual network (the transmit data 806_1 for the first individual network in FIG. 8), the transmit data 403_2 for the second individual network (the transmit data 806_2 for the second individual network in FIG. 8), . . . , and the transmit data 403_N for the Nth individual network (the transmit data 806_N for the Nth individual network in FIG. 8) based on the control signal 409.

The transmit data distributing unit 402 does not always output all of the transmit data 403_1 for the first individual network, the transmit data 403_2 for the second individual network, . . . , and the transmit data 403_N for the Nth individual network. The transmit data distributing unit 402 outputs transmit data of individual networks including communication stations which send a modulated signal. Information on how to control distribution by the transmit data distributing unit 402 is included in the control signal 409.

The received data analysis and received data distributing unit 405 takes the received data 404_1 from the first individual network (the received data 805_1 from the first individual network in FIG. 8), the received data 404_2 from the second individual network (the received data 805_2 from the second individual network in FIG. 8), . . . , and the received data 404_N from the Nth individual network (the received data 805_N from the Nth individual network in FIG. 8), and the control signal 409 as input, performs analysis and distribution of the received data based on the control signal 409, and outputs the received data 406 (received data 803_1 in FIG. 8).

The received data analysis and received data distributing unit 405 also retrieves a terminal request from control information contained in each of the received data 404_1 from the first individual network, received data 404_2 from the second individual network, . . . , and received data 404_N from the Nth individual network, and outputs the terminal request signal 407. The terminal request contains information on communication stations that the terminal can access and/or information on communication stations with which the terminal has already established links, for example.

The wireless communication scheme selecting unit 408 takes the (network-side) request signal 400 and the terminal request signal 407 as input, and determines communication stations which will send a modulated signal and communication stations which will receive a modulated signal, and outputs the control signal 409 including these information.

Figure 10:
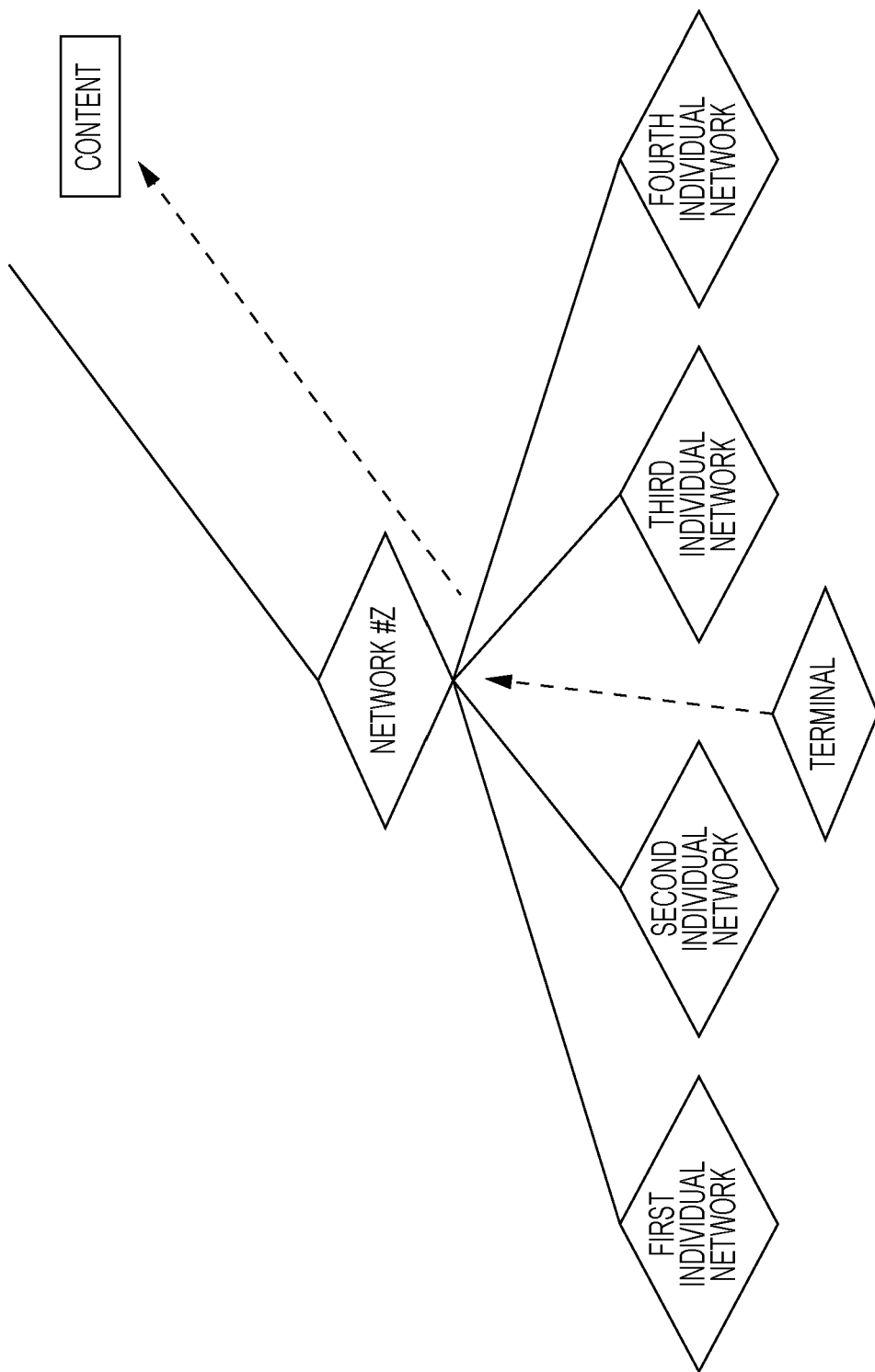
FIG. 10 shows an example of communication condition in the second embodiment.

Next, a process for a terminal to acquire content on a network that is located further upstream of the host network via individual network(s) including communication station(s) and a host network (#Z) in this embodiment will be described. The host network includes the host proxy server and the host server described in FIG. 8. FIG. 10 shows an example of communication condition. In the example shown in FIG. 5, the terminal establishes links with the first to fourth individual networks including the first to fourth communication stations respectively, and requests content data via at least one or more of these individual networks.

This embodiment involves a process to register information on individual networks that the terminal can access with the host network (an initial setting process) and a process for the terminal to acquire content. An example of the initial setting process will be described first.

Figure 11:
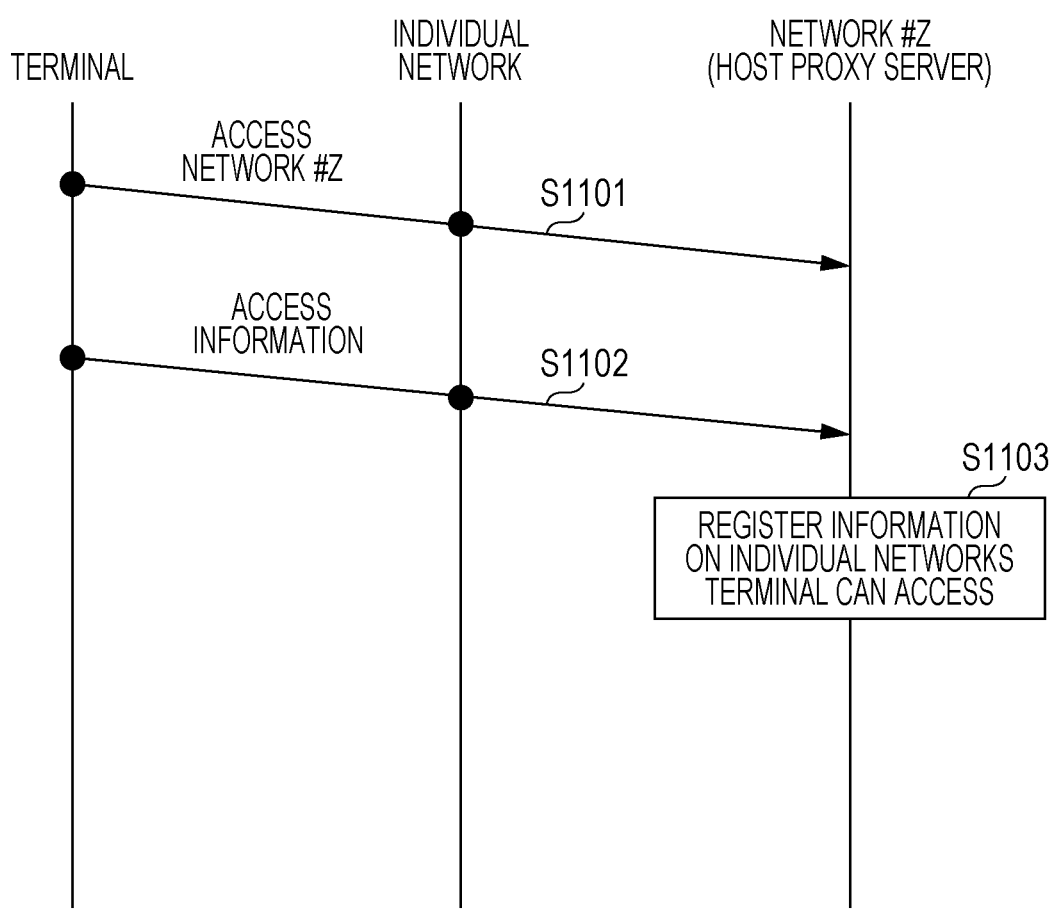
FIG. 11 is a sequence diagram showing an example of an initial setting process in the second embodiment.

FIG. 11 is a sequence diagram showing an example of the initial setting process in the second embodiment. The process shown in FIG. 11 is the initial setting process performed by the terminal with the host network #Z. FIG. 11 shows only one individual network for the sake of simplicity.

The terminal accesses the host network #Z via one individual network (S1101). Here, the terminal may receive a response indicating a successful access from the host network #Z.

The terminal then transmits access information on N individual networks respectively including N communication stations that the terminal can access (connect to) to the host proxy server of the host network #Z via one individual network (S1102).

Based on the access information, the host proxy server of the host network #Z registers the information on the individual networks including communication stations that the terminal can access (at some location) (S1103).

For example, the terminal may be equipped with a modem related to a mobile phone but have no contract with a company that provides data communication over a mobile phone. In such a case, a network associated with mobile phones will not be included in individual networks including communication stations that the terminal can access. That is, a network corresponding to a modem that exists as such in a terminal but does not function as a modem due to contract and the like will not be included in the individual networks including communication stations that the terminal can access.

While the example of FIG. 11 shows a case where the individual network via which the terminal accesses the network #Z is the same as the individual network via which the terminal transmits access information to the host proxy server, they may be different from each other.

After completion of the initial setting process shown in FIG. 11, the terminal obtains content data via the host network #Z.

Figure 12:
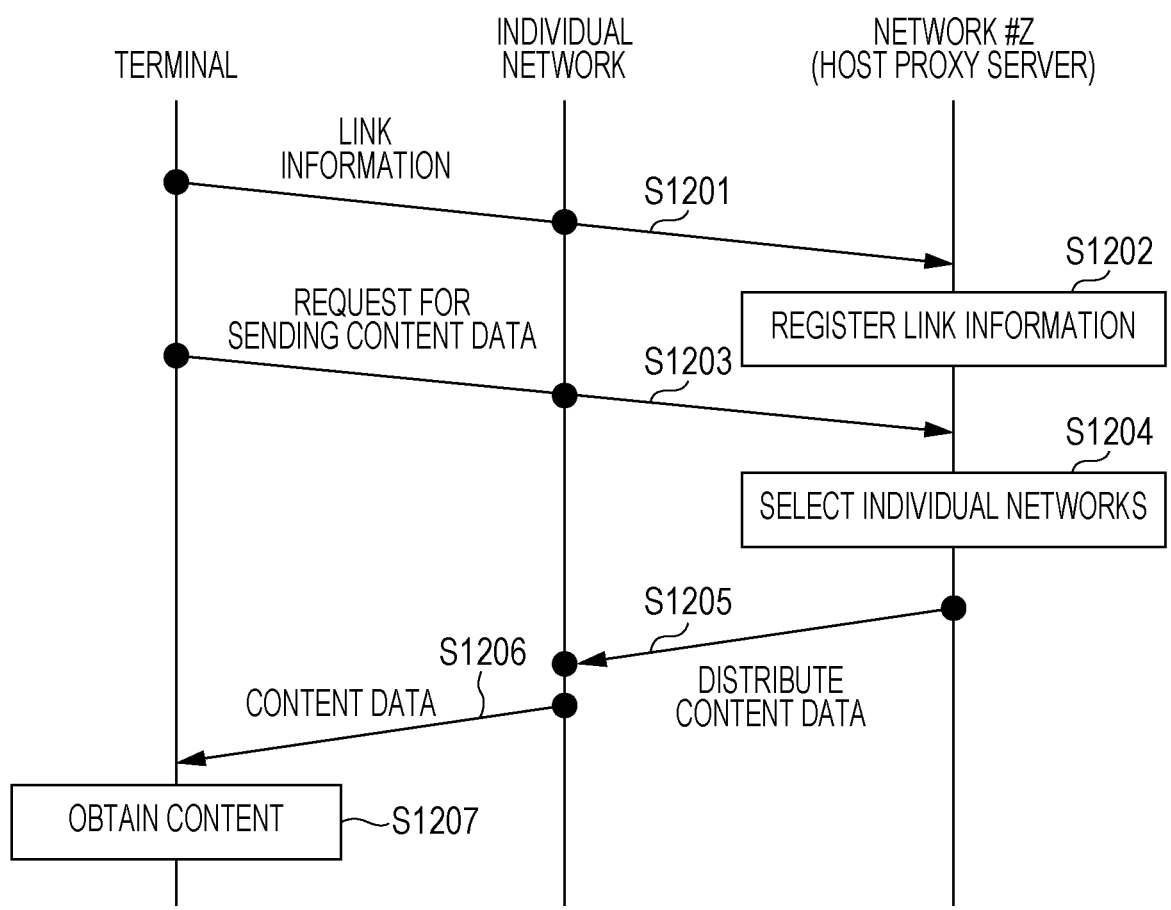
FIG. 12 is a sequence diagram showing the procedure of the content acquisition method in the second embodiment.

FIG. 12 is a sequence diagram showing the procedure of the content acquisition method in this embodiment. For the sake of simplicity, FIG. 12 shows only one individual network. In the following, the procedure of the content acquisition method will be described with reference to FIG. 12.

The terminal transmits information on individual networks including communication stations with which it has already established links (link information) to the host proxy server of the host network #Z via an individual network including one of the communication stations (S1201). For example, the link information includes information on M individual networks respectively including M communication stations (M being an integer from 2 to N inclusive) with which the terminal has established links. This provides the host proxy server of the host network #Z with link information on communication stations with which the terminal has already established links.

The host proxy server of the host network #Z registers the link information on individual networks including communication stations with which the terminal has already established links (S1202).

The terminal transmits a request for transmitting content data via an individual network including one of the communication stations by way of the proxy server of that individual network (S1203).

Based on the link information on communication stations with which the terminal has already established links, the host proxy server of the host network #Z selects individual networks including communication stations to be used for transmitting content data (S1204). For example, the host proxy server of the host network #Z selects L individual networks (L being an integer from 2 to M inclusive) based on the link information.

The host proxy server of the host network #Z distributes content data to the individual network(s) including the communication station(s) to be used for transmitting content data and transmits them (S1205). There may be a plurality of individual networks including communication stations which will send content data.

Each of the individual networks including the communication stations transmits content data via its proxy server in accordance with the instruction from the host proxy server of the host network #Z (S1206). For example, when the host proxy server selects L individual networks, each of the L individual networks transmits the content data.

The terminal receives the content data transmitted from at least one or more individual networks including the communication station(s), and performs reception processing and combining processing on the received data to obtain the content data (S1207). For example, when receiving content data via L individual networks, the terminal performs reception processing for each of the L communication schemes after receiving the data. The terminal then combines the data after reception processing to obtain the content.

While the example of FIG. 12 shows that content data is transmitted via a single individual network, content data may be transmitted via a plurality of individual networks. Also, while the example of FIG. 12 shows a case where the individual network via which the terminal transmits link information to the proxy server, the individual network via which the terminal makes a request for content data, and the individual network via which content data is transmitted to the terminal are the same one individual network, they may be different from each other.

Details of the communication conditions in FIG. 12 are as shown in FIG. 8. The terminal described in FIG. 12 has the configuration shown in FIG. 2. The host proxy server described in FIG. 12 has the configuration shown in FIG. 4. The operation at S1204 described in FIG. 12 is conducted by the wireless communication scheme selecting unit 408 of FIG. 4. The operation at S1205 is conducted by the transmit data distributing unit 402 of FIG. 4.

The received data analysis and received data distributing unit 405 takes the received data 404_1 from the first individual network, the received data 404_2 from the second individual network, . . . , and the received data 404_N from the Nth individual network, and the control signal 409 as input. The received data analysis and received data distributing unit 405 then performs analysis and distribution of the received data based on the control signal 409, and outputs the received data 406. With this configuration, the received data analysis and received data distributing unit 405 conducts the receiving operations at S1201 and S1203 in FIG. 12.

To the received data analysis and received data distributing unit 405, not all of the received data 404_1 from the first individual network, the received data 404_2 from the second individual network, . . . , and the received data 404_N from the Nth individual network are always input. To the received data analysis and received data distributing unit 405, only received data from individual networks that received a modulated signal from the terminal 810 are input. Information on how to control analysis and distribution of received data by the received data analysis and received data distributing unit 405 is included in the control signal 409.

Next, the content transmitting method described with FIGS. 10, 11, and 12 will be described using FIGS. 7A to 7C.

For example, assume that, based on FIG. 11, the host proxy server of the host network #Z registers the first individual network including the first communication station, the second individual network including the second communication station, and the fourth network including the fourth communication station as individual networks including communication stations that the terminal can access.

Assume further that, based on FIG. 12, the host proxy server of the host network #Z makes selection so that content data is to be transmitted via the first individual network including the first communication station and the fourth individual network including the fourth communication station. This selection is made by the wireless communication scheme selecting unit 408 of FIG. 4.

How the transmit data distributing unit 402 of FIG. 4 of the host proxy server having the configuration shown in FIG. 4 distributes the transmit data in this embodiment will be described using FIGS. 7A to 7C.

FIG. 7A illustrates the transmit data 401 in FIG. 4, FIG. 7B illustrates the transmit data 403_1 for the first individual network in FIG. 4, and FIG. 7C illustrates the transmit data for the fourth individual network in FIG. 4. The horizontal axis in FIGS. 7A to 7C represents time.

As shown in FIG. 7A, it is assumed that data are input to the transmit data distributing unit 402 of FIG. 4 as data #1, data #2, data #3, . . . , with respect to the time on the horizontal axis. The unit of data may be any of bit, byte, packet, or frame.

The transmit data distributing unit 402 of FIG. 4 then determines to send data #1 via the first individual network including the first communication station; thus the data is placed as shown in FIG. 7B.

The transmit data distributing unit 402 of FIG. 4 also determines to send data #2, data #3, data #7, data #9, . . . via the first individual network including the first communication station; thus the data are placed as shown in FIG. 7B.

The transmit data distributing unit 402 of FIG. 4 further determines to send data #4 via the fourth individual network including the fourth communication station; thus the data is placed as shown in FIG. 7C.

Similarly, the transmit data distributing unit 402 of FIG. 4 determines to send data #5, data #6, data #8, data #10, . . . via the fourth individual network including the fourth communication station; thus the data are placed as shown in FIG. 7C.

In this embodiment, the transmit data distributing unit 402 of FIG. 4 of the host proxy server, having the configuration shown in FIG. 4, distributes the data shown in FIG. 7B to the first individual network and the data shown in FIG. 7C to the fourth individual network. The first communication station included in the first individual network and the fourth communication station included in the fourth individual network each send the distributed data to the terminal.

Data related to the content requested by the terminal for transmission may include an information packet comprising information bits for the body data of the content and a parity packet comprising parity bits attached for error correction of the body data of the content. In this case, the data related to the content will be coded with an error correction code. The error correction code introduced in this layer is referred to as application layer forward error correction (FEC). At the communication stations described hereinafter, coding with the error correction code is performed again for wireless transmission, for example. That is, error correction coding at the physical layer (PHY layer) is performed. When an information packet and a parity packet are transmitted, the individual network including the communication station that transmits the information packet may be different from the individual network including the communication station that transmits the parity packet. By receiving the information packet and the parity packet via different individual networks, reception processing at the terminal apparatus is kept from becoming complicated.

When the application layer FEC is not introduced, packets would be generated from the content body, for example.

As described above, a communication terminal capable of transmitting and receiving modulated signals of a plurality of wireless communication schemes shares link information on individual networks including communication stations with which it already established links with the host proxy server present on the host network. Based on the link information, the host proxy server instructs a plurality of communication stations to send data of the requested content to the terminal. This makes the terminal obtain content data via a plurality of communication stations corresponding to a plurality of communication schemes, efficiently improving the data transmission rate. Furthermore, this provides the effect of improved efficiency of frequency utilization.

This embodiment has been described by taking wireless LAN, Bluetooth®, the third generation mobile phone, and the fourth generation mobile phone as examples of communication schemes as described in FIG. 3, but communication schemes are not limited to these. This embodiment can be similarly practiced when other wireless communication scheme is selected as one of the communication schemes used for simultaneous transmission.

Although it is described as proxy server in this embodiment, the proxy server may instead be the server. Likewise, the server may instead be the proxy server. Accordingly, a configuration including no proxy server or no server is also possible.

Although it is described as host proxy server in this embodiment, the host proxy server may instead be the host server. Likewise, the host server may instead be the host proxy server. Accordingly, a configuration including no host proxy server or no host server is also possible.

It goes without saying that the embodiments and other matters described herein may be practiced in combination.

In addition, the embodiments and other matters are only illustrative; when specific modulation schemes, error (erasure) correction coding schemes (such as the error correction code, code length, and coding rate being used), control information, and the like are illustrated, for example, a practice with a similar configuration is still possible with application of other modulation schemes, error (erasure) correction coding schemes (such as the error correction code, code length, and coding rate being used), control information, and the like.

As to the modulation scheme, the embodiments and other matters described herein can be still practiced with a modulation scheme other than ones described herein. For example, modulation schemes such as amplitude phase shift keying (APSK) (for example, 16APSK, 64APSK, 128APSK, 256APSK, 1024APSK, 4096APSK), pulse amplitude modulation (PAM) (for example, 4PAM, 8PAM, 16PAM, 64PAM, 128PAM, 256PAM, 1024PAM, 4096PAM), phase shift keying (PSK) (for example, BPSK, QPSK, 8PSK, 16PSK, 64PSK, 128PSK, 256PSK, 1024PSK, 4096PSK), quadrature amplitude modulation (QAM) (for example, 4QAM, 8QAM, 16QAM, 64QAM, 128QAM, 256QAM, 1024QAM, 4096QAM) may be applied, or the mapping may be uniform or non-uniform in such modulation schemes.

The transmission method used within a wireless communication scheme may be a transmission method in which the transmitting apparatus transmits signals via a single antenna and the receiving apparatus receives signals via one or more antenna (single-input single-output (SISO) transmission method or single-input multiple-output (SIMO) transmission method), or a method in which the transmitting apparatus transmits a plurality of streams and the receiving apparatus receives modulated signals at one or more antennas (multiple-input multiple-output (MIMO) transmission scheme or multiple-input single-output (MISO) transmission scheme). It is also possible to employ space-time block code or space-time trellis code (when a multicarrier scheme such as OFDM is employed, symbols may be arranged in the time axis direction, in the frequency axis direction, or the frequency-time axis direction).

The present disclosure is not limited to what is described in the above embodiments but can be practiced in any form intended for attaining the object of the present disclosure and related or associated objects, such as follows, for example.

(1) A program descriptive of the procedure of the operation of the communication apparatus on the communication station side described in the above embodiments may be prestored in read-only memory (ROM), from which the program may be read and executed by a central processing unit (CPU). Alternatively, a program descriptive of the procedure of the operation of the communication apparatus on the communication station side may be stored in a computer-readable storage medium, from which the program may be stored in random access memory (RAM) of a computer so that the program stored in the RAM is read and executed by the CPU of the computer.

(2) Configurations such as the above-described embodiments may be implemented in large scale integration (LSI), which is typically an integrated circuit. They may be individually implemented as single chips, or all or some of the configurations of an embodiment may be implemented as a single chip.

Although referred to as LSI here, it may be also called integrated circuit (IC), system LSI, super LSI, or ultra LSI depending on the degree of integration.

The technique for circuit integration is not limited to LSI but may adopt a dedicated circuit or a general purpose processor. A field programmable gate array (FPGA), which can be programmed after LSI manufacture, or a reconfigurable processor permitting reconfiguration of connections and/or settings of circuit cells inside the LSI may be utilized.

Further, provided that a circuit integration technique replacing LSI emerge with advancement in semiconductor technology or other derivative technology, such a technique could be employed for functional block integration, of course. Application of biotechnology is one such possibility.

Herein, the transmitting apparatus can be provided in communication or broadcast equipment such as broadcast stations, base stations, access points, terminals, or mobile phones; then the receiving apparatus can be provided in communication equipment such as television sets, radios, terminals, personal computers, mobile phones, access points, or base stations, for example. The transmitting apparatus and receiving apparatus herein can also be some equipment having communication capability and capable of being connected to a apparatus for executing applications, such as a television set, radio, personal computer, mobile phone, via some interface.

In the embodiments of the present disclosure, symbols other than data symbols, for example, pilot symbols (preambles, unique words, postambles, reference symbols, and so forth), or symbols for control information, may be arranged in any manner within a frame. In addition, although referred herein as pilot symbols or symbols for control information, they may be named in any way as the function itself is important.

Pilot symbols may be known symbols modulated with PSK modulation in a transceiver (or the receiver may know the symbols transmitted by the transmitter through synchronization) for example; the receiver will use the symbols to perform frequency synchronization, time synchronization, (per-modulated-signal) channel estimation (estimation of channel state information (CSI)), signal detection, and the like.

The symbols for control information are symbols for transmitting information that needs to be transmitted to the other party of communication other than data (such for an application) in order to implement communication (for example, the modulation scheme, error (erasure) correction coding scheme, and the coding rate for the error (erasure)

correction coding scheme being used for communication, setting information for upper layers, and so forth).

Although it is necessary to inform the transmitting apparatus and the receiving apparatus of the transmission method (MIMO, SISO, time-space block code, interleaving scheme), modulation scheme, error correction coding scheme, and packet-level error (erasure) correction scheme, description of them is omitted in some embodiments. Symbols for transmitting these pieces of information will be present in frames transmitted by the transmitting apparatus, and the receiving apparatus will change its operation by receiving them.

The present disclosure is not limited to the embodiments described but may be practiced with various modifications. For example, while the embodiments are described as being practiced as a communication apparatus, the communication method may alternatively be implemented in software.

According to the present disclosure, a plurality of communication stations transmit a plurality of modulated signals so that data is efficiently transmitted from a network through negotiation by a communication terminal capable of transmitting and receiving modulated signals of a plurality of wireless communication schemes with a proxy server present in the network. The communication terminal receives a plurality of modulated signals to obtain data. The present disclosure is accordingly useful for improving the efficiency of frequency utilization, for example.

What is claimed is:

1. A terminal apparatus comprising:
   a receiver which, in operation, receives a first downlink data signal transmitted from a first communication station and receives a second downlink data signal transmitted from a second communication station, the first downlink data signal and the second downlink data signal being respectively received over a first downlink channel and a second downlink channel that are at least partially overlapped in a frequency domain, wherein simultaneous use of the first downlink channel and the second downlink channel is configured by a higher layer based on link information indicating communication stations with which the terminal apparatus has established access; and
   reception signal control circuitry which, in operation, demodulates the first downlink data signal and the second downlink data signal received over the first downlink channel and the second downlink channel that are at least partially overlapped in the frequency domain.

2. The terminal apparatus according to claim 1, wherein a first communication scheme used by the first communication station is same as a second communication scheme used by the second communication station.

3. The terminal apparatus according to claim 1, wherein the first downlink data signal and the second downlink data signal include a same data signal.

4. The terminal apparatus according to claim 1, wherein the receiver, in operation, receives a control signal that indicates scheduling information for receiving the first downlink data signal and the second downlink data signal.

5. A communication method for a terminal apparatus, the communication method comprising:
   receiving a first downlink data signal transmitted from a first communication station and receiving a second downlink data signal transmitted from a second communication station, the first downlink data signal and the second downlink data signal being respectively received over a first downlink channel and a second downlink channel that are at least partially overlapped in a frequency domain, wherein simultaneous use of the first downlink channel and the second downlink channel is configured by a higher layer based on link information indicating communication stations with which the terminal apparatus has established access; and
   demodulating the first downlink data signal and the second downlink data signal received over the first downlink channel and the second downlink channel that are at least partially overlapped in the frequency domain.

6. The communication method according to claim 5, wherein a first communication scheme used by the first communication station is same as a second communication scheme used by the second communication station.

7. The communication method according to claim 5, wherein the first downlink data signal and the second downlink data signal include a same data signal.

8. The communication method according to claim 5, comprising receiving a control signal that indicates scheduling information for receiving the first downlink data signal and the second downlink data signal.

* * * * *